July 29, 1958  L. D. COBB  2,845,311
ANTIFRICTION BEARING
Filed April 26, 1954
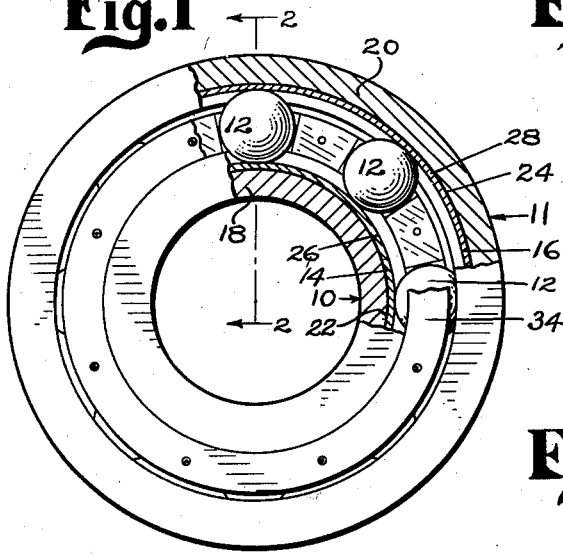
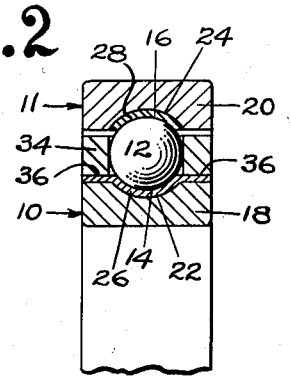
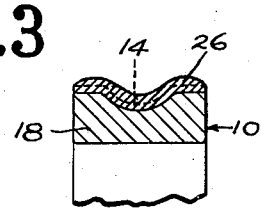
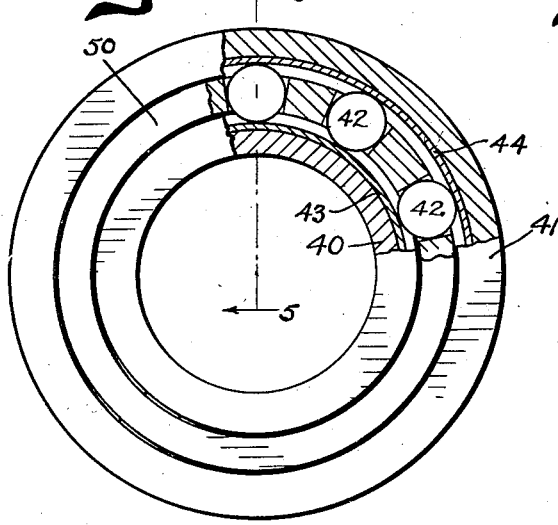
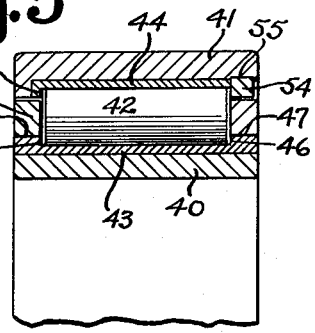
INVENTOR:
LELAND D. COBB
by Edward H. Goodrich
HIS ATTORNEY.

United States Patent Office 2,845,311
Patented July 29, 1958

2,845,311

ANTIFRICTION BEARING

Leland D. Cobb, Forestville, Conn., assignor to General Motors Corporation, Detroit, Mich., a corporation of Delaware Application April 26, 1954, Serial No. 425,651

3 Claims. (Cl. 308—216)

This invention relates to antifriction bearings and particularly to an antifriction bearing capable of withstanding high operating temperatures and which will resist corrosion.

With recent developments of improved precision machinery, it is often necessary to support members for high speed antifrictional rotation in the presence of corrosive fluids and at ambient temperatures near which bearing lubricants break down. Antifriction bearings, such as ball bearings having the usual single-piece hardened steel race rings have a very short life in the presence of corrosive conditions. Also, such bearings heat up rapidly and fail very quickly when insufficiently lubricated even for a short period. When such a bearing normally operating at a high temperature, is subjected to a sudden abnormally heavy duty load as is often the case, the bearing temperature rises very rapidly and lubrication usually fails, with the result there is galling of the raceways and metal deposition in the raceways as by welding usually causing immediate bearing failure. Such bearing break-down may result in severe damage to the mechanism associated with the bearing and may even seriously endanger lives particularly if the bearing failure is in an airplane.

It is, therefore, an object of this invention to provide an improved antifriction bearing capable of withstanding abnormally high operating temperatures under a minimum of lubricant and capable of operating for a considerable time even after lubricant failure.

It is a further object to provide an improved antifriction bearing wherein the rolling elements operate against hardened surfaces that require less than normal lubrication.

It is another object to provide an antifriction bearing having improved rolling elements and raceways which withstand sudden heavy duty loads at high operating temperatures.

It is a still further object to provide an improved and economical antifriction bearing capable of efficiently operating in the presence of corrosive conditions which rapidly cause failure of usual antifriction bearings.

To these ends and also to improve generally upon devices of this character, my invention consists in the various matters hereinafter described and claimed. In its broader aspects, the invention is not necessarily limited to the specific structures selected for illustrative purposes in the accompanying drawings wherein Figure 1 is an end elevation partly broken away and showing a ball bearing embodying my invention;

Figure 2 is a fragmentary cross section taken along the line 2—2 of Figure 1;

Figure 3 is a fragmentary sectional view through a bearing member and shows a very hard lining applied thereto;

Figure 4 is an end elevation partly broken away and showing a roller bearing embodying my invention, and Figure 5 is a fragmentary sectional view taken along the line 5—5 of Figure 4.

Generally considered, I have provided an antifriction bearing having inner and outer race rings separated by circumferentially spaced rolling elements engaging raceways in the race rings. These race rings are provided with annular inserts or liners in which the raceways are formed. These inserts and, if desired, the rolling elements are made of a very hard wear-resistant alloy which resists corrosion and has the characteristic of retaining its hardness and of resisting deterioration of the precisely ground raceways therein at elevated temperatures and under sparse lubricating conditions wherein prior antifriction bearings rapidly fail.

Referring to Figures 1 and 2, the antifriction bearing which is herein shown as a ball bearing comprises an inner race ring 10 and an outer race ring 11 with intervening rolling elements such as balls 12, these balls being rotatably engageable with transversely arcuate raceways 14 and 16. The inner and outer race rings are provided with body portions 18 and 20 which may be composed of a suitable corrosive resistant material such as low carbon stainless steel or various corrosive resistant die cast metals. These race rings are respectively provided with annular grooves 22 and 24 which preferably have cross sections of arcuate shape, the maximum transverse dimensions of these grooves being substantially less than that of the width of the race rings. The grooves 22 and 24 have bonded therein liners or inserts 26 and 28 of a very hard alloy that is wear-resistant and which will withstand extremely high operating temperatures and not break down or deteriorate under temperatures at which the normal steel used for high speed antifriction bearings will fail. One of these materials for these inserts which has been found highly satisfactory for this purpose is known under the trade name "Stellite" and comprises an alloy containing chromium, cobalt and tungsten. It will be appreciated that other hard wear resistant alloys may be used in the same manner and for the same purpose.

These alloy inserts or liners 22 and 24 are preferably integrally bonded to the race rings 10 and 11 as by oxyacetylene, metallic arc, heliarc or other suitable welding processes. These liners, after being welded in position, initially take the form as shown in Figure 3. After being welded to the rings 10 and 11, the inserts are ground to provide the usual raceways 14 and 16 which are rotatably engaged by the balls 12 that are circumferentially spaced as by a suitable separator 34. If desired, the balls may also be made of a very hard alloy such as "Stellite" or other suitable alloy.

In the present instance, the liner as 22 is shown as having annular lands 36 at each side of the raceway upon which the separator 34 may slidably rotate during bearing operation, this separator being preferably a suitable non-corrosive material such as stainless steel or the like. The liner 24 is shown as axially extending only throughout the width of the groove 24, but if desired it may also be provided with annular separator-engaging lands.

Referring now to Figures 4 and 5, an antifriction roller bearing is provided with the inner and outer rings 40 and 41 and with intervening rolling elements 42 engaging liners 43 and 44 of hard wear-resistant material, these liners being of suitable composition such as that used for the previously described liners 22 and 24. The rings 40 and 41 may be of a low carbon stainless steel to resist corrosion or of a suitable material as mentioned with respect to race rings 10 and 11. The liners or inserts 43 and 44 which are integrally bonded as by welding to the rings 40 and 41, have suitable raceways ground therein to receive the rollers 42 which may be also composed of a suitable hard wear-resistant alloy. In the present instance, the liner 43 is provided with roller guide shoulders 46 and cylindrical lands 47 which may be slidably engaged by an annular cage 50 that circumferentially spaces the rolling elements 42. The liner 44 may be ground to provide an end roller engaging shoulder 52 and the outer ring 41 may be suitably provided with a snap ring 54 demountably received within groove 55 to maintain the bearing in assembled relation.

High speed antifriction bearings as used in turbines and various types of engines are often subjected to sudden and extremely heavy duty overloads at temperatures near that at which the lubricant breaks down. If such a bearing is subjected to a temperature as high as or above 500° F., the lubricant rapidly deteriorates to the condition where the bearing may even run dry. It has been found that bearings having hard wear-resistant raceways, in accordance with my invention, will withstand sudden shock loads, will not deteriorate at the surface of the raceways and will even last for a considerable period after they run dry at temperatures up to 750° F. or even higher. One satisfactory hard lining insert which I have used for this purpose comprises a "Stellite" alloy containing approximately 65% cobalt, 30% chromium, and 5% tungsten. However, in many instances a "Stellite" containing as little as 50% cobalt provides a satisfactory hard lining or insert for my improved bearing. Additionally, the race ring body portions which support the hard inserts or liners, will slightly yield under sudden shock loads thereby preventing deterioration of the ground raceway of a liner under the impact of a rolling element. Hence, if such a bearing comprises an important part of an airplane engine and lubrication fails, the bearing will usually last long enough so that the plane may land and avoid a catastrophe.

I claim:

1. In an antifriction bearing having a pair of race rings, rolling elements engaging the race rings, a separator circumferentially spacing the rolling elements, one of the race rings having an annular metal body portion provided with a peripherally extending groove, an annular insert of a hard wear-resistant alloy integrally welded to the periphery of the annular body portion and lining said groove, said insert having a raceway formed therein and receiving the rolling elements, said lining having a cylindrical land at one side of the raceway and slidably supporting the separator, and said insert comprising an alloy having a hardness much greater than that of the annular body portion and which will not be permanently deformed under impact of the rolling elements at high operating temperatures of the bearing.

2. In an antifriction bearing having a pair of race rings, a series of rolling elements engaging the race rings, an annular separator circumferentially spacing the rolling elements, one of the race rings having a metal body portion provided with a peripherally extending groove, an annular extending ring of a hard wear-resistant alloy integrally welded throughout its periphery to said annular body portion and lining said groove, said insert having an annular raceway therein for receiving the rolling elements, said lining forming an annular hard wear-resistant land at each side of the raceway for slidably supporting the separator, and the insert comprising an alloy having a hardness greatly exceeding that of said annular body portion and which will not be permanently deformed under conditions of heavy load of the rolling elements at high bearing operating temperatures with substantially no lubrication.

3. In an antifriction bearing having a pair of race rings, a series of balls between the race rings, a rotatable separator circumferentially spacing the balls, one of the race rings having an annular metal body portion provided with a peripherally extending groove, an annular insert of hard wear-resistant alloy integrally welded to the periphery of the annular body portion and lining said groove and providing a raceway for receiving said balls, said lining forming at each side of the raceway a cylindrical land for slidably supporting the separator, and said insert comprising a metal alloy having a hardness much greater than that of the annular body portion and which will withstand heavy loads from the balls at high operating temperatures and under conditions of sparse lubrication.

References Cited in the file of this patent

UNITED STATES PATENTS

| | | |
|---|---|---|
| 558,642 | Fayol | Apr. 21, 1896 |
| 1,857,823 | Robinson | May 10, 1932 |
| 2,027,788 | Ridgeway et al. | Jan. 14, 1936 |
| 2,136,946 | McCurdy | Nov. 15, 1938 |
| 2,145,864 | Denneen et al. | Feb. 7, 1939 |
| 2,164,474 | Schaefer | July 4, 1939 |
| 2,244,197 | Hessler | June 3, 1941 |
| 2,368,549 | Kendall | Jan. 30, 1945 |
| 2,444,724 | Brown | July 6, 1948 |
| 2,644,671 | Ingram | July 7, 1953 |

FOREIGN PATENTS

| | | |
|---|---|---|
| 702,056 | Germany | Jan. 29, 1941 |
| 957,963 | France | Mar. 1, 1950 |
| 674,162 | Great Britain | June 18, 1952 |